Dec. 16, 1958  G. A. HEMPEL  2,864,394
AUTOMATIC RELIEF VALVE
Filed May 27, 1954
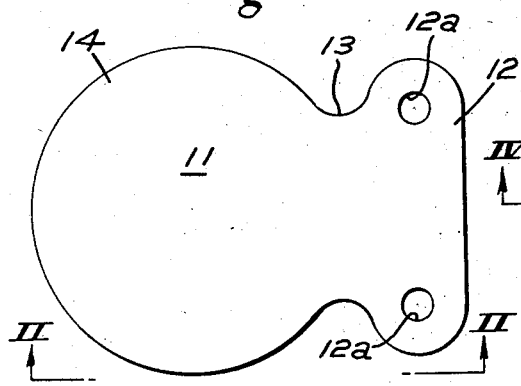
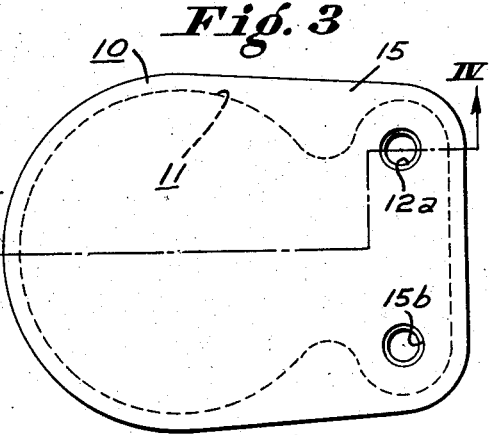
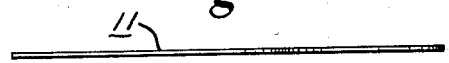
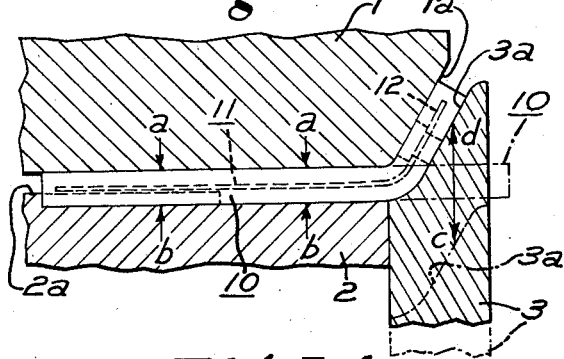
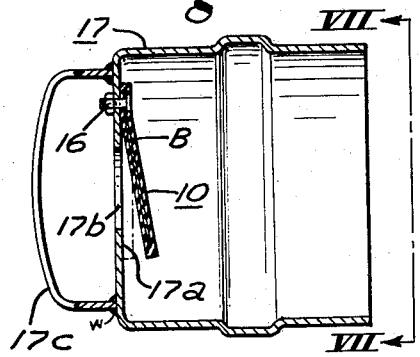
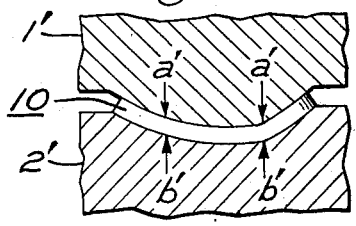
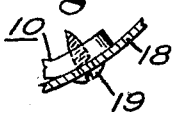
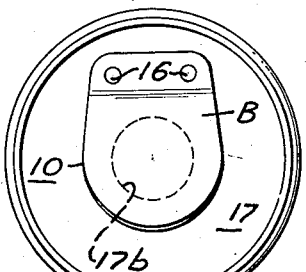
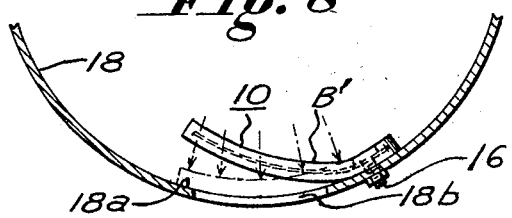
INVENTOR.
Gustav A. Hempel
BY Green, McCallister & Miller
his Attorneys.

United States Patent Office 2,864,394
Patented Dec. 16, 1958

2,864,394
AUTOMATIC RELIEF VALVE

Gustav A. Hempel, Pittsburgh, Pa., assignor to McDowell Manufacturing Company, Allegheny County, Pa., a corporation of Pennsylvania Application May 27, 1954, Serial No. 432,762

1 Claim. (Cl. 137—107)

This invention pertains to a relief valve for venting or draining a fluid from a liquid-carrying wall member and particularly, to an improved relief valve for use in venting air and draining liquid from members of a conduit or pipe system, such as employed for irrigating purposes.

In recent years there has been a growing demand for portable irrigation systems which utilize releasable, interconnected pipe or conduit sections or members that may be separately transported from one location to another to flexibly cover a relatively large crop area. Such systems have suitable spray heads or openings which are supplied through connected conduit sections with water under pressure.

In employing such a type of system, it is desirable to at least partially drain the water from each pipe section or from the line before the system or its sections are transported to a new location. Also, air venting is needed when the relatively empty sections have been connected together and are to be used at an irrigating location, in order that the system may be quickly and effectively filled up with water.

Previously, I have constructed an improved valve for this purpose which was devised particularly from the standpoint of one that could be effectively used across the curvature of a pipe section. In this construction, the valve body was provided with a central, reinforcing metal part for its seating shoulder. A T-shaped flexible metal part was secured on the central part with opposite, projecting portions extending therefrom. Both of these parts were inset within the valve body; the head portion of the T-shaped part served as a mounting for the valve and this part was flexed and placed under tension at its mounted end when its head portion was secured on the wall portion of the fluid-carrying member. When positive liquid pressure was applied to the member, the opposite projecting portions of the T-shaped part were flexed to move the relatively rigid reinforcing part and the seating shoulder into seating engagement with the wall portion to close off the vent opening therein. Thus, in this construction, the seating shoulder and the reinforcing part were held in substantially a transverse plane while the opposite projecting portions of the T-shaped part were flexed towards the curvature of the wall portion by the application of liquid pressure to effect the closing action and, in view of their flexibility, to open the valve when pressure was relieved.

This type of valve, of relatively planar or flattened outline or shape, was mounted in its operative position across the curvature of the wall member and over a vent hole therein and was, in such a utilization, always under stress or strain adjacent its mounting end portion, regardless of whether it was in an open or closed position.

Although this previous construction marked a great advance in the art of relief valves and is being used successfully in the art, I have found that there was a further need for a simplified relief valve and one which would be of a type having the same basic construction or design, but by a simple manipulative operation, which could be adapted for utilization either to close off a vent opening across the curvature of the wall member or to close off a vent opening in an end wall of a relatively flat or planar wall of a pipe member or of a dead end pipe fitting. One of the primary needs was for a highly practical, but inexpensive type of valve which would be effective in both types of utilizations and essentially effective in the latter type of utilization.

In carrying out my present invention, I departed from several principles employed in my earlier construction and in doing so have been able to provide a valve which will be highly effective as applied to a relatively planar closing-off or seating surface of a wall portion of a liquid-carrying member and one which can also be adapted for a closing-off a curvilinear seating surface as an incident to a transverse or cross-positioning on a curved seating portion of a wall member.

It has thus been an object of my present invention to provide a new and improved form of relief valve which is of relatively inexpensive construction, but which will stand up under long periods of usage;

Another object has been to devise a general construction of relief valve which, by relatively simply shaping operation, can be adapted for use with either a planar seating surface or a curvilinear seating surface;

A further object of my invention has been to provide a simplified, but highly effective form of relief valve;

These and many other objects of my invention will appear to those skilled in the art from the illustrated embodiment and the description that I have set forth in the specification.

In the drawings, Figure 1 is a plane view of an integral or one-piece flexible inset element or integral part of my valve construction;

Figure 2 is a side view in elevation of the part of Figure 1;

Figure 3 is a top plan view of a complete valve constructed in accordance with my invention and comprising a valve body of gasket material molded about the part of Figures 1 and 2;

Figure 4 is a side section in elevation taken along the line IV—IV of Figure 3;

Figure 5 is a somewhat fragmental side section in elevation illustrating apparatus and procedure for pre-setting or shaping the unit of Figures 3 and 4 to meet requirements of the type of utilization shown in Figure 6; Figure 5 is of the same scale as Figures 1 to 4 inclusive;

Figure 5A is reduced fragmental side section in elevation illustrating apparatus and procedure for pre-setting or shaping the unit of Figures 3 and 4 to meet requirements of the type of utilization shown in Figure 8;

Figure 6 is a reduced side section in elevation through an end wall member, such as a dead end fitting, and illustrates the application of a valve of my invention for utilization with a relatively planar or flat seating surface;

Figure 7 is an end view in elevation on the scale of Figure 6 and taken in the direction of the line VII—VII of that figure;

Figure 8 is a transverse section taken centrally of a valve 10 and a hole 18b and enlarged from the scale of Figures 6 and 7; it illustrates the utilization of a valve of my invention with a curvilinear seating surface; and Figure 9 is a fragmental section on the scale of Figure 8 illustrating a modified type of mounting or securing means for the valve of Figures 6 and 8.

In carrying out my present invention, I discovered that an integral, flexible, inset unit, element or part 11 of figures 1 and 2, such as of relatively thin, one-piece metal construction, could be successfully employed without the need for a reinforcing or separately-formed portion of relatively little or no flexibility in an opposed relationship or in the general area of the seating surface of the valve body. I provide a valve 10 having a preshaped bend or set at its mounting head portion which will normally retain it in an open position, but in such open position, will not inherently subject it to flexure forces set up by reason of such a positioning. In other words, the construction is such that the valve, in its normal open position, is in a relatively unstressed relationship and is only stressed when it is moved under fluid or liquid pressure to a closed position and while it is in such a closed or seating position. The valve is, in no sense, stressed when in its normal open position, regardless of whether it is being used to seat upon a planar or upon a curvilinear seating surface about the vent hole in the wall portion of a fluid-carrying member.

In devising the valve on my present invention, I determined that a single-piece, flexible metal inset could be so constructed and positioned within the molded body of gasket material that it would fully reinforce such gasket material and make the operation of the valve independent of the resiliency or elasticity of such material, e. g., of rubber. Further, I determined that a good seating action could be obtained and particularly, in connection with a planar seating surface, even if as disclosed in my present construction, the body portion of the metal inset which is in an adjacent position within or is opposed to the seating surface of the valve body, is, itself, relatively flexible and of a nature that permits such seating surface to flex and fully shape-conform in its seating action.

The construction of the illustrated valve of my invention is such that it has a tab-like mounting head portion at one end that is to be securely clamped or mounted on the wall portion of the fluid-carrying member. The mounting head portion is connected by a neck portion of lesser extent to a somewhat rounded body portion of greater extent. Since the valve unit is constructed by employing a relatively flat or planar inset metal part and a surrounding or enclosing gasket body which is molded thereabout to enclose it, I discovered that the unit, as thus produced, could be easily and quickly adapted for utilization with either a flattened seating surface or a curvilinear seating surface by providing its inset metal part with a pre-set or prebent angular relationship about its neck portion, and that this could be accomplished by applying die pressure or force beyond the elastic limit of the metal in a localized area defined by the neck portion of the metal part and through the surrounding or enclosing body of gasket material. In this connection, a relatively slight pre-set angular relationship is sufficient if the valve is to be employed with a planar seating surface and a slightly greater or more abrupt angular relationship may be provided when it is to be used with a curvilinear seating surface.

Since the flexible metal part is protected from active corrosion by the body part, I have been able to employ spring steel which lends itself to such a type of utilization and without the necessity of using more corrosive-resistant metals or alloys which are not so conducive to a proper set or to a flexing action after such a set which are, of course, more expensive and do not necessarily lend themselves to a high flexibility with a relatively thin section.

Referring to the drawings in Figures 1 and 2, I have shown a stamped-out metal part 11 having a transversely-extending tab-like mounting head portion 12 that is provided with a pair of spaced-apart mounting holes 12a. The portion 12 is connected by a neck portion 13 (shown of narrowed extent) to the body portion 14 and, as shown in Figures 3 and 4, gasket material 15 is fully molded about the relatively flat part 11 to form the complete valve unit 10.

As shown particularly in Figure 4, the gasket body 15 which may be of rubber-like material, is provided with a pair of holes 15a in alignment with the holes 12a and in alignment with enlarged holes 15b which are open to an opposite side of the gasket body. As shown particularly in Figures 6, 7 and 8, the holes 15b and 15a serve respectively to receive head and stem portions of nut and bolt assemblies 16 to mount the valve unit on the wall portion of a fluid-carrying member.

Referring to Figure 5, I have illustrated how the mounting portion 12 may be pre-set to a desired angular relationship by the utilization of a pair of holddown die members 1 and 2 and a punch die member 3. This figure shows how the flattened shape of the unit 10 of Figure 4 may be pre-set to an angular shape for utilization, for example, with a substantially planar seating surface 17a, see Figure 6. The slope of opposed die surfaces 1a and 3a will govern the extent of the set or governing bend which is accomplished in moving the die 3 from the dot and dash line position of Figure 5 to the full line position. The main body of the valve unit is, at this time, firmly clamped by forces a and b between the holddown die members 1 and 2 and is aligned by a projecting ridge portion 2a of the bottom die member 2. A full desired set angle of the mounting portion of the valve unit is effected when the punch die 3 moves from position c to d. To provide a lesser set angle (the showing of Figure 5 is slightly exaggerated for clearer illustration), the slope of the die surfaces 1a and 1b is of a lesser extent.

In Figures 6 and 7, I have indicated a valve unit of my invention having a slight angular relationship by the reference B and in Figure 8, I have indicated a unit having a slightly greater angular relationship and curved seating portions by the reference B'. Although I have illustrated the flat surface utilization of my valve unit 10, as applied to a closure end member or dead end fitting 17 of a conduit member in Figures 6 and 7, it will be apparent that it may be applied to any type of planar seating wall portion. The closure member 17 is provided with a seating wall portion 17a, a vent opening 17b and a positioning handle 17c. The handle 17c is shown secured in position by weld metal w. In Figure 8, a tubular or curvilinear wall or conduit member 18 is shown provided with a curvilinear seating surface 18a and a drain and vent opening or hole 18b.

In Figure 5A, I have shown how the mounting portions of valve unit 10 may be pre-set with an angular relationship and how the connecting and seating portions may be simultaneously given a curved (inwardly concave) shape to correspond substantially to the curvature of a pipe member 18 and its seating area 18a. A punch die 1' and a stationary die 2' are shown as applying forming forces a' and b', respectively. Although type B may be employed for relatively small diameter pipe 18, type B' is more desirable for the type of mounting shown in Figure 8, since it can be made to a shorter length, is highly effective for any size of pipe, and provides a larger flow opening when in its open position.

The valve 10 of my invention, as distinguished from an ordinary flap valve, is not dependent for its operation upon an elastic hinge portion, but on the other hand, depends for its opening and closing action upon the flexure of the flexible inset element or part 11 and upon a conforming movement of the surrounding gasket body 15. The flexing action of my valve is not limited to a hinge line, but provides a seat-conforming action along its full extent from its mounting portion. The integral mounting portion 12 of the flexible part 11 and the surrounding mounting portion of the gasket body are to be secured in position upon the wall portion of a fluid-carrying member in a substantially flush relationship therewith.

As previously intimated, a valve 10 of my construction is adaptable for various types of utilizations, essentially when, for example, it is used as a relief valve for a fluid-carrying system. It is of a type which has a pre-set angular relationship between its mounting portion and its seating portion at or adjacent its connecting neck portion.

As previously explained, the amount of the set angular relationship will depend upon particular requirements of utilization of the valve. A pre-set angular relationship of the type above set forth inherently biases the valve 10 to an open, neutral stress position. The seating face on one side of the seating portion of its body 15 will have a fluid-pressure proportioned seating engagement upon the wall portion to close off the vent opening therein, as effected by a positive application of fluid pressure upon the opposite side of the seating portion of the body, and such as accomplished when a positive flow of liquid is introduced into a pipe line system. On the other hand, when positive fluid pressure is released, the inherent flexibility of the valve 10 causes it to move towards an open position to drain the liquid in the system. In the initial stages of filling up the system, the valve 10 is utilized to venting air therefrom until liquid pressure is directly applied to the opposite side of its seating portion.

In Figure 9, I have shown an alternative mounting means for a valve of my construction, whether it is of pre-set type B or B'. As shown, I eliminate the pair of mounting holes shown in Figures 1, 3 and 4 and employ a pair of self-tapping metal screws 19 instead of a pair of nut and bolt assemblies 16.

What I claim is:

An improved relief valve of the character shown and described to open and close-off a vent opening having a seating wall portion thereabout in a fluid-carrying member which comprises, a one-piece spring-like metal part of relatively thin section having a transversely-extending tab-like mounting portion provided with mounting holes therein, a neck-like connecting portion of narrowed extent, and a substantially larger seating portion, said metal part being of substantially uniform relatively thin sectional thickness along its full extent; a resilient body molded about and enclosing said metal part, said resilient body extending and being of substantially uniform thickness along said metal part to provide a metal part and resilient body assembly, said body having a transverse mounting portion at one end thereof about the mounting portion of said metal part and having a seating portion about the seating portion of said metal part; securing means extending through the mounting holes of said metal part to secure the mounting portions in a substantially flush relationship upon the seating wall portion of the fluid-carrying member, said metal part having a pre-set angular relationship between its mounting and seating portions and about its connecting portion to maintain the seating portions in a normally open non-stressed relationship with respect to the vent opening, seating portions of the assembly and essentially of said metal part having a pre-shaped contour when the seating portions are in both their open and closed positions that substantially corresponds to the contour of the seating wall portion, the assembly being sensitive to a positive application of fluid pressure upon one side to move the opposite side into an effective seating engagement with the seating wall portion and about the vent opening by fluid pressure acting on the substantially large seating portion to readily flex the narrow neck-like connecting portion of said metal part into a stressed closed position, so that it will spring back into its normally open non-stressed position when fluid pressure is released, and said seating portions of said assembly are of substantially planar shape to correspond to a planar contour of the seating wall portion of the fluid-carrying member.

References Cited in the file of this patent

UNITED STATES PATENTS

| | | |
|---|---|---|
| 436,616 | Thring | Sept. 16, 1890 |
| 2,476,320 | Paulus | July 19, 1949 |
| 2,512,694 | Stout | June 27, 1950 |
| 2,661,764 | Johnson | Dec. 8, 1953 |
| 2,730,115 | Hempel | Jan. 10, 1956 |

FOREIGN PATENTS

| | | |
|---|---|---|
| 545,646 | Germany | Aug. 12, 1931 |
| 801,926 | France | of 1936 |
| 808,192 | France | of 1936 |
| 103,613 | Sweden | of 1942 |